(12) United States Patent
Haruna et al.

(10) Patent No.: US 12,630,749 B2
(45) Date of Patent: May 19, 2026

(54) CONDUCTIVE ADHESIVE LAYER

(71) Applicant: TATSUTA ELECTRIC WIRE & CABLE CO., LTD., Higashiosaka (JP)

(72) Inventors: Yuusuke Haruna, Kizugawa (JP); Hiroshi Tajima, Kizugawa (JP)

(73) Assignee: TATSUTA ELECTRIC WIRE & CABLE CO., LTD., Osaka (JP)

( * ) Notice: Subject to any disclaimer, the term of this patent is extended or adjusted under 35 U.S.C. 154(b) by 135 days.

(21) Appl. No.: 18/552,174

(22) PCT Filed: Mar. 16, 2022

(86) PCT No.: PCT/JP2022/011981
§ 371 (c)(1),
(2) Date: Sep. 23, 2023

(87) PCT Pub. No.: WO2022/202560
PCT Pub. Date: Sep. 29, 2022

(65) Prior Publication Data
US 2024/0182759 A1      Jun. 6, 2024

(30) Foreign Application Priority Data
Mar. 26, 2021    (JP) ................................. 2021-052818

(51) Int. Cl.
C09J 9/02        (2006.01)
C09J 11/04      (2006.01)

(52) U.S. Cl.
CPC ..................................... C09J 9/02 (2013.01); C09J 11/04 (2013.01)

(58) Field of Classification Search
CPC ....... C09J 9/02; C09J 11/04; C09J 7/10; C09J 2203/326; C09J 2301/312; C09J 2301/314;
(Continued)

(56) References Cited

U.S. PATENT DOCUMENTS 4,113,981 A * 9/1978 Fujita ....................... H01B 1/24
252/514
2018/0082971 A1* 3/2018 Lin .......................... H01L 24/32
(Continued)

FOREIGN PATENT DOCUMENTS

JP        2013041869 A      2/2013
JP        2013245234 A  * 12/2013
(Continued)

OTHER PUBLICATIONS

JP2013245234A Machine Translation of Description (Year: 2025).*
(Continued)

*Primary Examiner* — Cynthia L Schaller
(74) *Attorney, Agent, or Firm* — Rankin, Hill & Clark LLP

(57)        ABSTRACT

An object of the present disclosure is to provide a conductive adhesive layer in which the connection stability between objects that are conductive members is excellent, and the connection stability is maintained even when the conductive adhesive layer is subjected to high temperature. The conductive adhesive layer is a conductive adhesive layer including a binder component and conductive particles, wherein the conductive particles include conductive particles A having a median diameter of 100% or more of a thickness of the conductive adhesive layer, and conductive particles B having a median diameter of 1 to 50% of the median diameter of the conductive particles A, a content of the conductive particles is 110 to 900 parts by mass based on 100 parts by mass of the binder component, and a mass ratio of the conductive particles A to the conductive particles B is 0.1 to 7.2.

18 Claims, 1 Drawing Sheet

(58) Field of Classification Search
CPC .. C09J 2301/408; C09J 201/00; C09J 163/00; C08K 2201/001; C08K 2201/003; C08K 3/08; C08K 7/00; C08K 7/18; H01B 1/00; H01B 1/22; H05K 9/00
See application file for complete search history.

(56) References Cited

U.S. PATENT DOCUMENTS

| | | | |
|---|---|---|---|
| 2018/0353658 A1 | 12/2018 | Murano et al. | |
| 2019/0241770 A1 | 8/2019 | Shirakawa et al. | |
| 2020/0321305 A1 | 10/2020 | Shirakawa et al. | |
| 2020/0385543 A1* | 12/2020 | Kawahara | B32B 27/38 |

FOREIGN PATENT DOCUMENTS

| | | |
|---|---|---|
| JP | 2019065062 A | 4/2019 |
| JP | 2019110282 A | 7/2019 |
| TW | 201424887 A | 7/2014 |
| WO | 2014054618 A1 | 4/2014 |
| WO | 2017145842 A1 | 8/2017 |
| WO | 2018043505 A1 | 3/2018 |
| WO | 2019131904 A1 | 7/2019 |

OTHER PUBLICATIONS

International Search Report dated Apr. 26, 2022, issued in connection with International Application PCT/JP2022/011981.

Written Opinion dated Apr. 26, 2022, issued in connection with International Application PCT/JP2022/011981.

Office Action dated Dec. 22, 2022, from Japanese Application 2022-541243.

Translation of Written Opinion dated Apr. 26, 2022, issued in connection with International Application PCT/JP2022/011981, submitted previously with application.

Office Action dated Jul. 5, 2024, in corresponding Taiwanese patent application.

* cited by examiner

CONDUCTIVE ADHESIVE LAYER

CROSS-REFERENCE TO RELATED APPLICATIONS

This application is the U.S. National Stage of International Application PCT/JP2022/011981 filed Mar. 16, 2022, the contents of which are incorporated by reference and the priority benefit of which is claimed. That application is based on Japanese Application JP 2021-052818 filed Mar. 26, 2021, the contents of which are incorporated by reference and the priority benefit of which is claimed.

TECHNICAL FIELD

The present disclosure relates to a conductive adhesive layer.

BACKGROUND ART

Printed circuit boards are frequently used in electronic apparatuses such as cellular phones, video cameras, and notebook computers in order to incorporate circuits into the mechanisms. In addition, printed circuit boards are also utilized for the connection of movable portions such as printer heads to control portions. In these electronic apparatuses, electromagnetic wave shielding measures are essential, and also for the printed circuit boards used in the apparatuses, shielded printed circuit boards subjected to electromagnetic wave shielding measures are used.

The shielded printed circuit boards have, for example, a structure in which an electromagnetic wave shielding film is placed on a substrate film including a printed circuit so that the adhesive face of the electromagnetic wave shielding film in which an adhesive (adhesive layer), a metal thin film, and an insulating layer are stacked in this order adheres closely, and subsequently the adhesive adheres to the substrate film by heating and pressurization (thermocompression bonding).

The printed circuit boards are used with electronic components mounted. For printed circuit boards, flexible printed circuit boards (FPCs) that are bendable are known. For printed circuit boards used for FPCs, electronic components are likely to fall off when the sites on which the electronic components are mounted bend sharply, and therefore for the purpose of preventing this, reinforcing members may be provided on the printed circuit boards. For the reinforcing members, reinforcing members having conductivity that can be grounded to external potentials may be used for the purpose of allowing electromagnetic waves that enter or are produced in printed circuit boards to escape externally. For example, Patent Literature 1 discloses a printed circuit board with a reinforcing member including a reinforcing member having conductivity and a conductive adhesive.

CITATION LIST

Patent Literature

Patent Literature 1: Japanese Patent Laid-Open No. 2013-41869

SUMMARY OF INVENTION

Technical Problem

Isotropic conductive adhesive layers are frequently used as conductive adhesive layers (conductive adhesive sheets) used in printed circuit boards with reinforcing members having conductivity.

However, there is much contact resistance of conductive particles in a thickness direction in an isotropic conductive adhesive layer, and thus the resistance value in the thickness direction tends to be high. On the other hand, in an anisotropic conductive adhesive layer in which the amount of the conductive particles in a conductive adhesive is smaller than that in the isotropic conductive adhesive layer, the amount of the conductive particles filling the opening provided on an electromagnetic wave shielding film to ensure conduction between a ground circuit and a reinforcing member on the ground side is insufficient, the conductivity between the ground circuit and the reinforcing member on the ground side decreases, and the connection stability tends to be poor. The smaller the diameter of the opening is, the more the amount of the conductive particles filled in the opening is reduced, and accordingly the reduction of connection stability is more noticeable. In addition, there have been cases where even when the initial connection stability is good, the conductivity decreases when the conductive adhesive layer is subjected to high temperature in a reflow step or the like.

Therefore, it is an object of the present disclosure to provide a conductive adhesive layer in which the connection stability between objects that are conductive members is excellent, and the connection stability is maintained even when the conductive adhesive layer is subjected to high temperature.

Solution to Problem

The present disclosure provides a conductive adhesive layer including a binder component and conductive particles, wherein the conductive particles include conductive particles A having a median diameter of 100% or more of a thickness of the conductive adhesive layer, and conductive particles B having a median diameter of 1 to 50% of the median diameter of the conductive particles A, a content of the conductive particles is 110 to 900 parts by mass based on 100 parts by mass of the binder component, and a mass ratio of the conductive particles A to the conductive particles B [conductive particles A/conductive particles B] is 0.1 to 7.2.

The conductive particles A are preferably metal particles having a 20% compressive strength of 1.0 to 25 MPa in a 170° C. environment.

The shape of the conductive particles A is preferably a spherical shape.

The shape of the conductive particles B is preferably a flaky shape or a dendritic shape.

Advantageous Effects of Invention

In the conductive adhesive layer of the present disclosure, the connection stability between objects that are conductive members is excellent, and the connection stability is maintained even when the conductive adhesive layer is subjected to high temperature. Therefore, for example, when the conductive adhesive layer is used for the adhesion of a ground circuit and a reinforcing member on the ground side, it is excellent in the connection stability between the ground circuit and the reinforcing member on the ground side, even with a small-diameter opening.

DESCRIPTION OF EMBODIMENTS

Conductive Adhesive Layer

The conductive adhesive layer of the present disclosure includes at least a binder component and conductive particles. The conductive particles include conductive particles (conductive particles A) having a median diameter of 100% or more of the thickness of the conductive adhesive layer, and conductive particles (conductive particles B) having a median diameter of 1 to 50% of the median diameter of the conductive particles A. For each of the binder component, the conductive particles A, and the conductive particles B, only one type may be used, or two or more types may be used.

Figure 1:
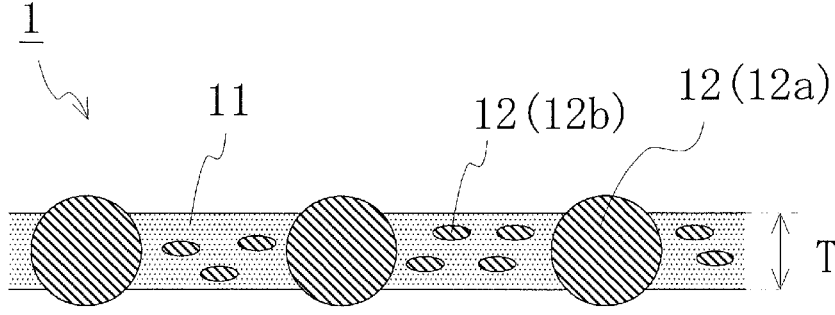
FIG. 1 is a cross-sectional view showing one embodiment of the conductive adhesive layer of the present disclosure.

FIG. 1 shows one embodiment of the conductive adhesive layer of the present disclosure. A conductive adhesive layer (1) is layered (sheet-shaped) and includes a binder component (11) and conductive particles (12). The conductive particles (12) include conductive particles A (12*a*) and conductive particles B (12*b*). At least a part of the conductive particles A (12*a*) protrudes from the surface of the adhesive portion composed of the binder component (11).

Conductive Particles A

As described above, the conductive adhesive layer includes the conductive particles A having a median diameter (D50) of 100% or more of the thickness of the conductive adhesive layer, as the conductive particles. The thickness of the conductive adhesive layer refers to the thickness in the region in which the conductive particles of the adhesive portion composed of the binder component do not protrude in a state before the binder component flows (for example, the thickness T shown in FIG. 1). As used herein, the median diameter of the conductive particles A refers to, when the conductive particles A are compressed, the median diameter in a state before compression. The median diameter of the conductive particles A is preferably 150% or more, more preferably 200% or more, and further preferably 250% or more of the thickness of the conductive adhesive layer. The median diameter of the conductive particles A is 100% or more, and thus, when the particle diameter of the conductive particles A is sufficiently thicker than the adhesive layer thickness and the binder component flows due to heating or the like and the conductive particles A enter in an opening of an electromagnetic wave shielding film, the conductivity of the conductive adhesive layer in the thickness direction is excellent.

The median diameter of the conductive particles A is preferably 1000% or less, more preferably 900% or less, further preferably 750% or less, and particularly preferably 500% or less of the thickness of the conductive adhesive layer. When the median diameter of the conductive particles A is 1000% or less, the close adhesion strength to an object is better.

The median diameter of the conductive particles A is preferably 1 to 90 μm, more preferably 5 to 75 μm, and further preferably 10 to 45 μm. When the median diameter is 1 μm or more, the conductivity in the thickness direction is more exhibited by the conductive particles A. In addition, the dispersibility of the conductive particles is good, and aggregation can be suppressed. When the median diameter is 90 μm or less, the close adhesion strength of the conductive adhesive layer to an object is better.

Examples of the conductive particles A include metal particles, metal-coated resin particles, metal fibers, carbon fillers, and carbon nanotubes.

Examples of metal constituting the metal particles and the coated portion of the metal-coated resin particles include gold, silver, copper, nickel, zinc, indium, tin, lead, bismuth, and alloys containing two or more thereof. Only one of the metal may be used, or two or more of the metals may be used.

Specific examples of the metal particles include copper particles, silver particles, nickel particles, silver-coated copper particles, indium particles, tin particles, lead particles, bismuth particles, gold-coated copper particles, silver-coated nickel particles, gold-coated nickel particles, indium-coated copper particles, tin-coated copper particles, lead-coated copper particles, bismuth-coated copper particles, indium-coated nickel particles, tin-coated nickel particles, bismuth-coated nickel particles, and silver-coated alloy particles. Examples of the silver-coated alloy particles include silver-coated copper alloy particles in which alloy particles including copper (for example, copper alloy particles including an alloy of copper, nickel, and zinc) are coated with silver. The metal particles can be made by an electrolysis method, an atomization method, a reduction method, or the like.

Among them, the conductive particles A are preferably metal particles having a 20% compressive strength of 1.0 to 25 MPa in a 170° C. environment. The compressive strength is more preferably 5.0 to 23 MPa, and further preferably 11 to 22 MPa. When the conductive particles A is metal particles having a compressive strength within the above range, the particles are moderately compressed when high pressure is applied in a high temperature environment, the particle shape can be maintained, and the conductivity in the thickness direction is better. The 20% compressive strength of the metal particles is measured in accordance with JIS Z 8844:2019. The compressive strength refers to, when the conductive particles A are compressed, the compressive strength in a state before compression.

The conductive particles A preferably include at least tin as a constituent metal. The content of tin in the conductive particles A is preferably 80% by mass or more, more preferably 85% by mass or more, further preferably 90% by mass or more, and particularly preferably 94% by mass or more based on 100% by mass of the total amount of the conductive particles A. It is presumed that tin in the conductive particles A forms alloys with objects having conductivity (a ground circuit, a reinforcing member on the ground side, and the like) at the interface during thermocompression bonding. Therefore, when the conductive particles A include 80% by mass or more (in particular, 90% by mass or more) of tin, the connection stability between objects is maintained even when the conductive adhesive layer is subjected to high temperature in a reflow step or the like. The content is preferably 99.9% by mass or less, and more preferably 99.6% by mass or less. When the content is 99.9% by mass or less, the conductive particles A have a certain degree of hardness, and the conductive particles A are not too compressed when high pressure is applied in a high temperature environment, and it is easy to ensure conduction between objects.

As a constituent metal of the metal particles containing tin, a further metal other than tin may be contained. Examples of the further metal include gold, silver, copper, platinum, nickel, zinc, lead, palladium, bismuth, antimony, and indium. The metal particles containing tin preferably include a metal harder than tin, such as gold, silver, copper, platinum, nickel, or palladium, as the further metal, from the viewpoint of better connection stability. For each of the other metals, only one may be included, or two or more may be included.

Examples of the shape of the conductive particles A include a spherical shape (a true spherical shape, a spheroidal shape, or the like), a flaky shape (a scaly shape or a flat shape), a dendritic shape (dendrite shape), a fibrous shape, and an irregular shape (polyhedron). Among them, a spherical shape is preferable from the viewpoint that the conductivity in the thickness direction is better.

The content of the conductive particles A in the conductive adhesive layer is preferably 10 to 70% by mass, more preferably 15 to 60% by mass, and further preferably 20 to 50% by mass based on 100% by mass of the total amount of the conductive adhesive layer. When the content is 10% by mass or more, the conductivity in the thickness direction is better. When the content is 70% by mass or less, the flexibility of the conductive adhesive layer is excellent.

Conductive Particles B

As described above, the conductive adhesive layer includes the conductive particles B having a median diameter of 1 to 50% of the median diameter of the conductive particles A, as the conductive particles. The median diameter of the conductive particles B is preferably 5 to 30%, and more preferably 8 to 20% of the median diameter of the conductive particles A. With the median diameter of the conductive particles B within the above range, the resistance value of the conductive adhesive layer in a plane direction is reduced, and isotropic conductivity is exhibited. By combining the isotropic conductivity with the anisotropic conductivity by the conductive particles A, the connection stability between objects is better even when the conductive adhesive layer is subjected to high temperature.

The median diameter of the conductive particles B is preferably 0.5 to 25 μm, and more preferably 3 to 10 μm. When the median diameter is 0.5 μm or more, isotropic conductivity is more exhibited. In addition, the dispersibility of the conductive particles is good, and aggregation can be suppressed. When the median diameter is 25 μm or less, the close adhesion strength of the conductive adhesive layer to objects is better.

Examples of the conductive particles B include, as illustrated and described as the conductive particles A, metal particles, metal-coated resin particles, metal fibers, carbon fillers, and carbon nanotubes.

Among them, metal particles are preferable as the conductive particles B, and silver particles, silver-coated copper particles, and silver-coated copper alloy particles are preferable. From the viewpoints of excellent conductivity, suppressing the oxidation and aggregation of the conductive particles, and being able to lower the cost of the conductive particles, particularly silver-coated copper particles and silver-coated copper alloy particles are preferable.

Examples of the shape of the conductive particles B include a spherical shape (a true spherical shape, a spheroidal shape, or the like), a flaky shape (a scaly shape or a flat shape), a dendritic shape (dendrite shape), a fibrous shape, and an irregular shape (polyhedron). Among them, a flaky shape and a dendritic shape are preferable. The reason for this is as follows: by making the shape of the conductive particles B flaky or dendritic, a posture in which the conductive particles B overlap each other is likely to be taken, and thus the contact between the conductive particles B increases, and the conductivity in the planar direction improves. As a result of this improvement of the conductivity in the planar direction combined with the conductivity of the conductive particles A in the thickness direction, the conductivity of the entire conductive adhesive layer improves (is electrically stable), and the connection stability between objects can be more improved.

The content of the conductive particles B in the conductive adhesive layer is preferably 10 to 70% by mass, more preferably 15 to 60% by mass, and further preferably 20 to 50% by mass based on 100% by mass of the total amount of the conductive adhesive layer. When the content is 10% by mass or more, isotropic conductivity is more exhibited and anisotropic conductivity is more sufficiently exhibited. When the content is 70% by mass or less, the flexibility of the conductive adhesive layer is excellent.

The mass ratio of the conductive particles A to the conductive particles B [conductive particles A/conductive particles B] is 0.1 to 7.2, preferably 0.2 to 5.2, more preferably 0.3 to 4.0, and further preferably 0.5 to 2.7. With the mass ratio within the above range, the anisotropic conductivity by the conductive particles A and the isotropic conductivity by the conductive particles B are exhibited in good balance, and thus the conductive adhesive layer is excellent in the conductivity in the thickness direction, a rise in the connection resistance value is less likely to occur even when the conductive adhesive layer is subjected to high temperature, and the connection stability between objects that are conductive members is excellent.

The content (total amount) of the conductive particles in the conductive adhesive layer is 110 to 900 parts by mass, preferably 120 to 700 parts by mass, more preferably 150 to 500 parts by mass, and further preferably 150 to 300 parts by mass based on 100 parts by mass of the total amount of the binder component. With the content being 110 parts by mass or more, the content of the conductive particles is sufficient, a rise in the connection resistance value is less likely to occur even when the conductive adhesive layer is subjected to high temperature, and the connection stability between objects that are conductive members is excellent. With the content being 900 parts by mass or less, the contact opportunities between conductive particles are suppressed, a rise in the resistance value is suppressed, and the conductivity in the thickness direction is excellent. In addition, the flexibility and formability of the conductive adhesive layer is excellent.

Binder Component

Examples of the binder component include thermoplastic resins, thermosetting type resins, and active energy ray-curable type compounds. Examples of the thermoplastic resins include polystyrene-based resins, vinyl acetate-based resins, polyester-based resins, polyolefin-based resins (for example, polyethylene-based resins and polypropylene-based resin compositions), polyimide-based resins, and acrylic resins. Only one of the thermoplastic resin may be used, or two or more of the thermoplastic resins may be used.

Examples of the thermosetting type resins include both of resins having thermosetting properties (thermosetting resins) and resins obtained by curing the thermosetting resins. Examples of the thermosetting resins include phenol-based resins, epoxy-based resins, urethane-based resins, melamine-based resins, and alkyd-based resins. Only one of the thermosetting type resin may be used, or two or more of the thermosetting type resins may be used.

Examples of the epoxy-based resins include bisphenol type epoxy-based resins, spiro ring type epoxy-based resins, naphthalene type epoxy-based resins, biphenyl type epoxy-based resins, terpene type epoxy-based resins, glycidyl ether type epoxy-based resins, glycidylamine type epoxy-based resins, and novolac type epoxy-based resins.

Examples of the bisphenol type epoxy resins include bisphenol A type epoxy resins, bisphenol F type epoxy resins, bisphenol S type epoxy resins, and tetrabromobisphenol A type epoxy resins. Examples of the glycidyl ether type epoxy resins include tris (glycidyloxyphenyl) methane and tetrakis (glycidyloxyphenyl) ethane. Examples of the glycidylamine type epoxy resins include tetraglycidyl-diaminodiphenylmethane. Examples of the novolac type epoxy resins include cresol novolac type epoxy resins, phenol novolac type epoxy resins, α-naphthol novolac type epoxy resins, and brominated phenol novolac type epoxy resins.

Examples of the active energy ray-curable type compounds include both of compounds that can be cured by active energy ray irradiation (active energy ray-curable compounds) and compounds obtained by curing the active energy ray-curable compounds. The active energy ray-curable compounds are not particularly limited, and examples thereof include polymerizable compounds having one or more (preferably two or more) radical reactive groups (for example, (meth) acryloyl groups) in the molecule. Only one of the active energy ray-curable type compound may be used, or two or more of the active energy ray-curable type compounds may be used.

As the binder component, among them, thermosetting type resins are preferable. In this case, after the conductive adhesive layer is disposed on an object such as a printed circuit board or a shielded printed circuit board subjected to electromagnetic wave shielding measures, the binder component can be cured by pressurization and heating, and the adhesiveness of the lamination portion is good. For example, when the binder component is a thermosetting resin, the binder component after thermocompression bonding is a thermosetting type resin in which the thermosetting resin is cured.

When the binder component includes a thermosetting type resin, it may include a curing agent for accelerating a thermal curing reaction, as a component constituting the binder component. The curing agent can be appropriately selected according to the type of the thermosetting resin. Only one of the curing agent may be used, or two or more of the curing agents may be used.

The content of the binder component in the conductive adhesive layer is not particularly limited, and is preferably 5 to 50% by mass, more preferably 10 to 45% by mass, and further preferably 15 to 40% by mass based on 100% by mass of the total amount of the conductive adhesive layer. When the content is 5% by mass or more, the close adhesiveness to objects is better. When the content is 50% by mass or less, the conductive particles can be sufficiently blended, and the conductivity in the thickness direction is better.

The conductive adhesive layer may contain other components other than the above components within a range that does not impair the effects intended by the present disclosure. Examples of the other components include components included in known or commonly used adhesives. Examples of the other components include a curing accelerator, a plasticizer, a flame retardant, an antifoaming agent, a viscosity adjusting agent, an antioxidant, a diluent, an antisettling agent, a filler, a colorant, a leveling agent, a coupling agent, an ultraviolet absorbing agent, a tackifier resin, and an anti-blocking agent. For the other components, only one may be used, or two or more may be used. In addition, the conductive adhesive layer may include conductive particles other than the conductive particles A and the conductive particles B, and the ratio thereof is, for example, 10 parts by mass or less, preferably 5 parts by mass or less, and more preferably 1 part by mass or less based on 100 parts by mass of the sum of the conductive particles A and the conductive particles B.

The thickness of the conductive adhesive layer is preferably 1 to 40 µm, more preferably 5 to 30 µm. When the thickness is 1 µm or more, the close adhesion strength to objects is better. When the thickness is 40 µm or less, the cost can be reduced, and products including the conductive adhesive layer can be designed thin. The thickness of the conductive adhesive layer is the thickness in the region in which the conductive particles do not protrude (for example, the thickness T shown in FIG. 1). The thickness of the conductive adhesive layer when the adhesive component (binder component) constituting the conductive adhesive layer flows due to heating or the like and enters an opening formed in an object, or the like is the thickness of the adhesive layer in the region in which the adhesive component does not enter the opening.

For the conductive adhesive layer, the resistance value (initial resistance value) obtained by the following conductivity test is not particularly limited and is preferably 200 mΩ or less, more preferably 150 mΩ or less, and further preferably 100 mΩ or less. When the initial resistance value is 200 mΩ or less, the conduction between objects via the conductive adhesive layer is good.

Conductivity Test

The conductive adhesive layer is laminated on a SUS plate (thickness: 200 µm) by heating and pressurization under the conditions of temperature: 120° C. and pressure: 0.5 MPa for 5 s, the face on the conductive adhesive layer side is laminated on a printed circuit board for evaluation, and using a press machine, after evacuation for 60 s, the laminate is heated and pressurized under the conditions of temperature: 170° C. and pressure: 3.0 MPa for 30 min to prepare a board for evaluation. As the printed circuit board, a printed circuit board is used in which two copper foil patterns (thickness: 18 µm, line width: 3 mm) imitating a ground circuit are formed on a base member including a polyimide film having a thickness of 12.5 µm, and an insulating adhesive (thickness: 13 µm) and a coverlay including a polyimide film having a thickness of 25 µm are formed thereon. A circular opening simulating a ground connection portion having a diameter of 1 mm is formed in the coverlay. For the board for evaluation, the electrical resistance value between the copper foil patterns and the SUS plate is measured by a resistance meter and taken as the resistance value.

For the conductive adhesive layer, the resistance value (resistance value after reflow) obtained by the conductivity test, after passage through five cycles of a reflow step set in such a temperature profile that the conductive adhesive layer is exposed to hot air at 265° C. for 5 s, is not particularly limited and is preferably 200 mΩ or less, more preferably 150 mΩ or less, and further preferably 100 mΩ or less. When the resistance value is 200 mΩ or less, the conduction between objects via the conductive adhesive layer is good.

The resistance value after reflow is measured in the same manner as the conductivity test for the initial resistance value, for the board for evaluation after passage through five cycles of the reflow step.

For the conductive adhesive layer, the resistance value change rate [ (resistance value after reflow−initial resistance value)/initial resistance value×100] is not particularly limited and is preferably 50% or less, more preferably 10% or less, and further preferably 0% or less. When the resistance value change rate is 50% or less, a rise in the connection resistance value is less likely to occur even when the conductive adhesive layer is subjected to high temperature, and the connection stability between objects that are conductive members is better.

For the conductive adhesive layer, the close adhesion strength (peel force) to a gold-plated copper foil laminate film required in a peel test at ambient temperature and under the conditions of a tensile speed of 50 mm/min and a separation angle of 90° is not particularly limited and is preferably 4.5 N/cm or more, more preferably 10 N/cm or more, and further preferably 15 N/cm or more. When the close adhesion strength is 4.5 N/cm or more, the close adhesiveness of the conductive adhesive layer to objects is better. The gold-plated copper foil laminate film may be reinforced with a plastic film or the like so as not to be broken during the peel test. The specific method of the peel test is, for example, as described in the Examples described later.

The conductive adhesive layer is preferably for printed circuit board applications, particularly preferably for flexible printed circuit board (FPC) applications. The conductive adhesive layer is excellent in the connection stability between objects that are conductive members while being economically excellent, and the connection stability is maintained even when the conductive adhesive layer is subjected to high temperature. Therefore, the conductive adhesive layer can be preferably used as an electromagnetic wave shielding film or a conductive bonding film for a printed circuit board (particularly for an FPC). The conductive bonding film is intended for the attachment of a conductive (metal) reinforcing plate to a printed circuit board, and examples of the conductive bonding film also include a ground connection drawing film intended to allow electromagnetic waves that enter or are produced in a printed circuit board to escape externally.

A separate film may be stacked on at least one face of the conductive adhesive layer. That is, the conductive adhesive layer may be provided as a stack including a separate film and the conductive adhesive layer formed on the release face of the separate film. The separate film is peeled at the time of use.

The conductive adhesive layer can be manufactured by a known or commonly used manufacturing method. Examples include applying (coating) an adhesive composition forming the conductive adhesive layer on a temporary substrate such as a separate film or a substrate, and removing the solvent and/or partially cure the adhesive composition, as needed, to form the conductive adhesive.

The adhesive composition includes, for example, a resolvent (solvent), in addition to the components included in the conductive adhesive layer. Examples of the resolvent include toluene, acetone, methyl ethyl ketone, methanol, ethanol, propanol, and dimethylformamide. The solid concentration of the adhesive composition is appropriately set according to the thickness of the conductive adhesive layer to be formed, and the like.

For the application of the adhesive composition, a known coating method may be used. For example, a coater such as a gravure roll coater, a reverse roll coater, a kiss roll coater, a lip coater, dip roll coater, a bar coater, a knife coater, a spray coater, a comma coater, a direct coater, or a slot die coater may be used.

Printed Circuit Board With Reinforcing Member

Figure 2:
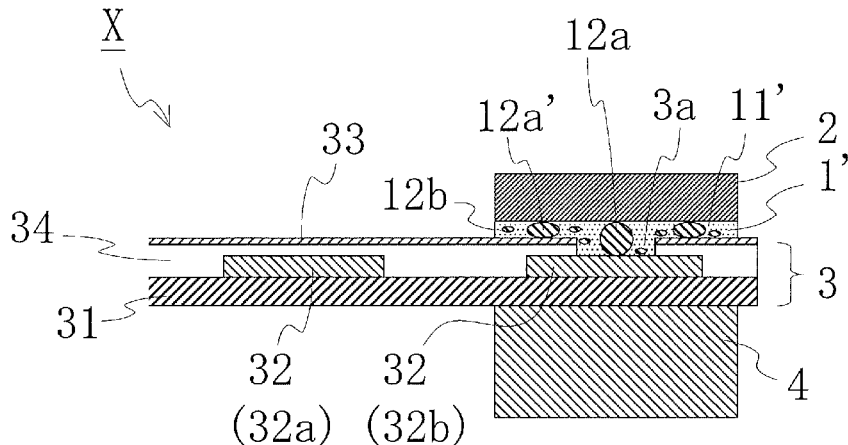
FIG. 2 is a cross-sectional view showing one embodiment of a printed circuit board with a reinforcing member to which the conductive adhesive layer of the present disclosure is applied.

FIG. 2 shows an example in which the conductive adhesive layer is applied to a printed circuit board with a reinforcing member. As shown in FIG. 2, a printed circuit board with a reinforcing member (X) that is one embodiment of a printed circuit board with a reinforcing member includes a printed circuit board (3), a conductive adhesive layer (1') provided on the printed circuit board (3), and a reinforcing member (2) having conductivity provided on the conductive adhesive layer (1').

The printed circuit board (3) has a base member (31), a circuit pattern (32) partially provided on a surface of the base member (31), an insulating protective layer (33) covering and insulating and protecting the circuit pattern (32), and an adhesive (34) for covering the circuit pattern (32) and adhering the circuit pattern (32) and the base member (31) to the insulating protective layer (33). The circuit pattern (32) includes a plurality of signal circuits (32a) and a ground circuit (32b). An opening (through hole) (3a) passing through the adhesive (34) and the insulating protective layer (33) in the thickness direction is formed in the adhesive (34) and the insulating protective layer (33) on the ground circuit (32b).

The conductive adhesive layer (1') is adhered to the insulating protective layer (33) surface of the printed circuit board (3) so as to cover and block the opening (3a), and a binder component (adhesive component) (11') fills the opening (3a). The conductive adhesive layer (1') is formed of conductive particles A (12a), (12a') and conductive particles B (12b) and the binder component (adhesive component) (11'). The conductive adhesive layer (1') has a thick film portion in which the thickness of the adhesive layer is relatively thick, and a thin film portion in which the thickness of the adhesive layer is relatively thin. The thick film portion corresponds to the portion filling the opening (3a), and the thin film portion corresponds to the portion located between the insulating protective layer (33) and the reinforcing member (2). The conductive particles A (12a) in the thick film portion are located between the reinforcing member (2) and the ground circuit (32b) and preferably provides conduction between the reinforcing member (2) and the ground circuit (32b) while being in contact with them. The thickness of the adhesive layer in the thick film portion is, for example, 50% or more (preferably 70% or more, more preferably 90% or more) of the maximum particle diameter of the conductive particles A (12a) in the adhesive layer thickness direction in the thick film portion. The conductive particles A (12a') in the thin film portion are located between the reinforcing member (2) and the insulating protective layer (33), compressively deformed by pressure, and preferably in contact with the reinforcing member (2) and the insulating protective layer (33). The thickness of the adhesive layer in the thin film portion is, for example, 50% or more (preferably 70% or more, more preferably 90% or more) of the maximum particle diameter of the conductive particles A (12a') in the adhesive layer thickness direction in the thin film portion. With the printed circuit board with the reinforcing member X having such a structure, the ground member (32b) and the reinforcing member (2) are brought into conduction via the conductive particles (12), the reinforcing member (2) functions as an external connection conductive layer, and the reinforcing member (2) surface is electrically connected to an external ground member.

When thermocompression bonding is performed in order to form the conductive adhesive layer (1'), the conductive particles A (12a) enter an opening (3a) and sufficiently exhibit the conductivity (anisotropic conductivity) in the thickness direction. The conductive particles A (12a') that are present in a thin film portion without entering the opening (3a) sufficiently exhibit the conductivity (anisotropic conductivity) in the thickness direction as the conductive particles A (12a). On the other hand, the conductive particles B (12b) exhibit isotropic conductivity. This isotropic conductivity allows conductivity to be exhibited in the plane direction and the thickness direction of each particle of the conductive particles A (12a), the conductive particles A (12a'), and the conductive particles B (12b). Thus, in the conductive adhesive layer (1'), by combining and allowing the anisotropic conductivity of the conductive particles A (12a), (12a') and the isotropic conductivity of the conductive particles B (12b) to be exhibited, the conductivity in the thickness direction is excellent as the conductive adhesive layer, the connection stability between objects that are conductive members is excellent, and connection stability is maintained even when the conductive adhesive layer is subjected to high temperature. Such effects are exhibited even when the diameter of the opening (3a) is small.

The conductive adhesive layer (1') can be obtained, for example, as follows: the conductive adhesive layer (1) before flowing or before curing that forms the conductive adhesive layer (1') is laminated on a surface of the reinforcing member (2) as needed, then laminated on the insulating protective layer (33) in the printed circuit board (3), and subsequently thermocompression bonded by flowing or curing the binder component (11) by heating, and thus the conductive particles A (12a) are sandwiched between the reinforcing member (2) and the insulating protective layer (33) and compressively deformed to form the conductive particles A (12a'), and while the binder component (adhesive component) (11) is adhered to the insulating protective layer (33), the binder component (11) is flowed and the binder component (11), the conductive particles A (12a), and the conductive particles B (12b) fill the opening (3a), and cured as needed, to form the binder component (11').

The mounting site provided on the face of the printed circuit board (3) opposite to the reinforcing member (2) is adapted so that the electronic component (4) is connected to the mounting site. The reinforcing member (2) is disposed opposed to the mounting site to which the electronic component (4) is to be connected. Thus, the reinforcing member (2) reinforces the mounting site for the electronic component (4). The reinforcing member (2) having conductivity is electrically connected to the ground circuit (32b) in the printed circuit board (3) via the conductive adhesive layer (1'). Thus, the reinforcing member (2) is kept at the same potential as the ground circuit (32) and therefore shields the mounting site for the electronic component (4) from external noise such as electromagnetic waves.

Examples

One embodiment of the conductive adhesive layer of the present disclosure will be described in more detail below based on Examples, but the conductive adhesive layer of the present disclosure is not limited only to these Examples.

Example 1

45.5 Parts by mass of a bisphenol A type epoxy-based resin (trade name "jER1256", manufactured by Mitsubishi Chemical Corporation), 0.05 parts by mass of a curing agent (trade name "ST14", manufactured by Mitsubishi Chemical Corporation), 24.5 parts by mass of metal particles (composition: Ag 3.5/Cu 0.75/Sn 95.75 (the numerical value represents mass ratio), 20% compressive strength at 170° C.: 20.0 MPa, conductive particles 1, and a spherical shape), and 30.0 parts by mass of a silver-coated copper powder (conductive particles 2, a dendritic shape) were blended in toluene so that the amount of solids was 20% by mass, and the blend was stirred and mixed to prepare an adhesive composition. The median diameters (D50) of the conductive particles 1 and 2 used are as shown in Table 1. The obtained adhesive composition was applied to the release-treated face of a PET film having a surface release-treated, and the solvent was removed by heating to form a conductive adhesive layer. In Example 1, the conductive particles 1 correspond to the conductive particles A, and the conductive particles 2 correspond to the conductive particles B.

Examples 2 to 7 and Comparative Examples 1 to 4

The conductive adhesive layer was made in the same manner as Example 1 except that the median diameter of the conductive particles in the conductive adhesive layer, the content of the conductive particles, the thickness of the conductive adhesive layer, and the like were changed as shown in Table 1. The median diameters (D50) of the conductive particles used in each Example are as shown in Table 1. In Examples 2 to 7, the conductive particles 1 correspond to the conductive particles A, and the conductive particles 2 correspond to the conductive particles B.

Evaluation

The conductive particles used in the Examples and the Comparative Examples, and the conductive adhesive layers obtained in the Examples and the Comparative Examples were evaluated as follows. The evaluation results are described in Table 1.

(1) Median Diameter

The median diameter of conductive particles was measured using a flow type particle image analysis apparatus (trade name "FPIA-3000", manufactured by SYSMEX CORPORATION). Specifically, measurement was performed using objective lens 10× by a bright field optical system in the LPF measurement mode with a conductive particle dispersion adjusted at a concentration of 4000 to 20000 particles/μl. The conductive particle dispersion was prepared by adding 0.1 to 0.5 ml of a surfactant to a sodium hexametaphosphate aqueous solution adjusted at 0.2% by mass, and adding 0.1±0.01 g of conductive particles that were a measurement sample. The suspension in which the conductive particles were dispersed was subjected to 1 to 3 min dispersion treatment by an ultrasonic disperser and subjected to the measurement. The median diameter of the conductive particles obtained by the measurement is shown in Table 1.

(2) Conductivity Test

Each of the conductive adhesive layers made in the Examples and the Comparative Examples was laminated on a SUS plate (thickness: 200 μm) that was a reinforcing member by heating and pressurization under the conditions of temperature: 120° C. and pressure: 0.5 MPa for 5 s, the PET film on the conductive adhesive layer was peeled, the face on the conductive adhesive layer side was laminated on a printed circuit board for evaluation, and using a press machine, after evacuation for 60 s, the laminate was heated and pressurized under the conditions of temperature: 170° C. and pressure: 3.0 MPa for 30 min to make a board for evaluation. The printed circuit board has two copper foil patterns (thickness: 18 μm, line width: 3 mm) extending parallel to each other at an interval, and an insulating protective layer (thickness: 25 μm) covering the copper foil patterns and including an insulating adhesive (thickness: 13 μm) and a polyimide having a thickness of 25 μm, on a base member including a polyimide film having a thickness of 12.5 μm, and an opening having a cylindrical shape exposing the copper foil patterns is provided in the insulating protective layer. This opening was adapted to be completely covered with the conductive adhesive layer when the conductive adhesive layer and the printed circuit board were superposed on each other. The electrical resistance value between the copper foil patterns and SUS plate of the obtained board for evaluation was measured using a resistance meter and taken as the resistance value (initial resistance value) between the printed circuit board and the SUS plate before reflow. Measurement was performed for each of four cases where the opening has a diameter of 0.8 mm, 1 mm, 1.4 mm, or 1.8 mm.

Next, heat treatment in which reflow treatment was assumed was performed, and the electrical resistance value after reflow was measured (resistance value after reflow). These heat treatment and the measurement of the electrical resistance value were repeated five times. Considering the use of lead-free solder, the temperature profile was set so that the conductive adhesive layer in the board for evaluation was exposed to 265° C. for 5 s. Then, the initial resistance value was shown in Table 1 as "connection resistance value (initial) " and the resistance value after reflow was shown in Table 1 as "connection resistance value (5 times reflow)".

(3) Close Adhesion Strength

Each of the conductive adhesive layers made in the Examples and the Comparative Examples and a metal reinforcing plate made of SUS (thickness: 200 μm) were heated and pressurized under the conditions of temperature: 120° C., time: 5 seconds, and pressure: 0.5 MPa using a press machine, further heated at 150° C. for 1 hour, and then the PET film was peeled to prepare a metal reinforcing plate with a conductive adhesive layer.

Next, a gold-plated layer of a copper foil laminate film having a base substrate including polyimide, a copper foil formed on a surface of the base substrate, and a gold-plated layer formed on a surface of the copper foil, and a metal reinforcing plate with a conductive adhesive layer were adhered under the same conditions as the thermocompression bonding, and then further adhered under the conditions of temperature: 170° C., time: 30 min, and pressure: 3 MPa using a press machine to prepare a copper foil laminate film with a metal reinforcing plate. Then, the copper foil laminate film with a metal reinforcing plate was fixed on the measurement stage with a double-coated pressure-sensitive adhesive sheet, the copper foil laminate film was separated from the conductive adhesive layer at ambient temperature, a tensile speed of 50 mm/min, and a separation angle of 90° using a tensile tester (trade name "AGS-X50S", manufactured by SHIMADZU CORPORATION), and the maximum value of the peel strength at break was measured. The conductive adhesive layer having a peel strength of 4.5 N/cm or more was evaluated to be excellent in close adhesiveness.

TABLE 1

| | | Example | | | | | | | Comparative Example | | | |
|---|---|---|---|---|---|---|---|---|---|---|---|---|
| | | 1 | 2 | 3 | 4 | 5 | 6 | 7 | 1 | 2 | 3 | 4 |
| Conductive particles 1 | D50 [μm] | 35.0 | 35.0 | 35.0 | 35.0 | 35.0 | 35.0 | 35.0 | 35.0 | 17.5 | 17.5 | 17.5 |
| | Content [% by mass] | 24.5 | 24.5 | 24.5 | 24.5 | 24.5 | 34.0 | 44.0 | 24.5 | 24.5 | 24.5 | 24.5 |
| Conductive particles 2 | D50 [μm] | 5 | 5 | 5 | 5 | 5 | 5 | 5 | 5 | 11 | 11 | 11 |
| | Content [% by mass] | 30.0 | 30.0 | 30.0 | 30.0 | 30.0 | 30.0 | 25.0 | 30.0 | 30.0 | 30.0 | 30.0 |
| Content of conductive particles [parts by mass] based on 100 parts by mass of binder component | | 120 | 120 | 120 | 120 | 120 | 178 | 223 | 120 | 120 | 120 | 120 |
| Mass ratio [conductive particles 1/conductive particles 2] | | 0.82 | 0.82 | 0.82 | 0.82 | 0.82 | 1.13 | 1.76 | 0.82 | 0.82 | 0.82 | 0.82 |
| Adhesive layer thickness [μm] | | 12.9 | 17.2 | 21.5 | 8.6 | 3.8 | 17.2 | 17.2 | 42.9 | 12.9 | 42.9 | 1.9 |
| [D50 of conductive particles 1/adhesive layer thickness] [%] | | 271 | 203 | 163 | 407 | 921 | 203 | 203 | 82 | 136 | 41 | 921 |
| [D50 of conductive particles 2/D50 of conductive particles 1] [%] | | 14 | 14 | 14 | 14 | 14 | 14 | 14 | 14 | 63 | 63 | 63 |
| Connection resistance value (initial) | 0.8 mm [Ω] | 0.154 | 0.199 | 0.161 | 0.089 | 0.045 | 0.006 | 0.006 | 0.413 | 0.098 | 0.235 | 0.054 |
| | 1.0 mm [Ω] | 0.049 | 0.079 | 0.073 | 0.069 | 0.035 | 0.005 | 0.005 | 0.268 | 0.054 | 0.094 | 0.034 |
| | 1.4 mm [Ω] | 0.016 | 0.024 | 0.044 | 0.027 | 0.032 | 0.004 | 0.004 | 0.120 | 0.039 | 0.048 | 0.032 |
| | 1.8 mm [Ω] | 0.009 | 0.012 | 0.033 | 0.015 | 0.028 | 0.003 | 0.003 | 0.070 | 0.032 | 0.036 | 0.028 |
| Connection resistance value (5 times reflow) | 0.8 mm [Ω] | 0.148 | 0.185 | 0.131 | 0.153 | 0.051 | 0.005 | 0.005 | 0.242 | 0.190 | 0.356 | 0.644 |
| | 1.0 mm [Ω] | 0.049 | 0.087 | 0.064 | 0.058 | 0.036 | 0.004 | 0.004 | 0.081 | 0.081 | 0.113 | 0.106 |
| | 1.4 mm [Ω] | 0.014 | 0.021 | 0.040 | 0.013 | 0.032 | 0.002 | 0.003 | 0.047 | 0.041 | 0.048 | 0.032 |
| | 1.8 mm [Ω] | 0.007 | 0.011 | 0.032 | 0.007 | 0.035 | 0.003 | 0.003 | 0.037 | 0.032 | 0.035 | 0.028 |
| Close adhesion strength [N/cm] | | 17.2 | 17.3 | 18.4 | 13.7 | 4.7 | 15.4 | 14.3 | 22.0 | 15.7 | 19.6 | 4.0 |

The conductive adhesive layers of the Examples were evaluated as follows: the initial resistance value was small, and the connection stability between the objects that were conductive members was excellent. In addition, the conductive adhesive layers of the Examples were evaluated as follows: the resistance value after reflow was also small, and good conductivity was maintained even when the conductive adhesive layers were subjected to high temperature. On the other hand, when the median diameter of the conductive particles 1 was less than 100% of the thickness of the conductive adhesive layer (Comparative Examples 1 and 3), the conductive adhesive layers of Comparative Examples 1 and 3 in the case where the diameter of the opening was 1 mm or less were evaluated as follows: the resistance value before and after reflow was high and connection stability was poor. In addition, when the median diameter of the conductive particles 2 was 50% or more of the median diameter of the conductive particles 1 while the median diameter of the conductive particles 1 was 100% or more of the thickness of the conductive adhesive layer (Comparative Examples 2 and 4), the conductive adhesive layers of Comparative Examples 2 and 4 were evaluated as follows: the resistance value after reflow was high, and connection stability was poor when the conductive adhesive layer was subjected to high temperature.

INDUSTRIAL APPLICABILITY

The conductive adhesive layer of the present disclosure can be used to connect the conductive member of electronic components.

REFERENCE SIGNS LIST

X printed circuit board with a reinforcing member
1, 1' conductive adhesive layer
11, 11' binder component (adhesive component)
12 conductive particles
12a, 12a' conductive particles A
12b conductive particles B
2 reinforcing member
3 printed circuit board
31 base member
32 circuit pattern
32a signal circuit
32b ground circuit
33 insulating protective layer
34 adhesive
4 electronic component

The invention claimed is:

1. A conductive adhesive layer, comprising:
a binder component, and
conductive particles,
wherein the conductive particles comprise first conductive particles (A) having a median diameter of 100% or more of a thickness of the conductive adhesive layer with at least some of the first conductive particles (A) protruding from the surface of the binder component of the conductive adhesive layer, and second conductive particles (B) having a median diameter of 1 to 50% of the median diameter of the first conductive particles (A);
a content of the conductive particles is 110 to 900 parts by mass based on 100 parts by mass of the binder component;

a mass ratio of the first conductive particles (A) to the second conductive particles (B) [first conductive particles (A)/second conductive particles (B)] is 0.1 to 7.2; and
the first conductive particles (A) are metal particles having a 20% compressive strength of 11 to 25 MPa in a 170° C. environment.

2. The conductive adhesive layer according to claim 1, wherein the first conductive particles (A) are spherical in shape.

3. The conductive adhesive layer according to claim 1, wherein the second conductive particles (B) are flaky in shape or dendritic in shape.

4. The conductive adhesive layer according to claim 1, wherein the first conductive particles (A) have a median diameter of 150% or more of a thickness of the conductive adhesive layer.

5. The conductive adhesive layer according to claim 1, wherein a median diameter of the first conductive particles (A) is 1 to 90 μm.

6. The conductive adhesive layer according to claim 1, wherein a content of the first conductive particles (A) in the conductive adhesive layer is 10 to 70% by mass of the total amount of the conductive adhesive layer.

7. The conductive adhesive layer according to claim 1, wherein a median diameter of the second conductive particles (B) is 0.5 to 25 μm.

8. The conductive adhesive layer according to claim 1, wherein a content of the second conductive particles (B) in the conductive adhesive layer is 10 to 70% by mass based on 100% by mass of the total amount of the conductive adhesive layer.

9. The conductive adhesive layer according to claim 1, wherein a median diameter of the first conductive particles (A) is 10 to 45 μm and a median diameter of the second conductive particles (B) is 3 to 10 μm.

10. The conductive adhesive layer according to claim 1, wherein a content of the first conductive particles (A) in the conductive adhesive layer is 20 to 50% by mass and a content of the second conductive particles (B) in the conductive adhesive layer is 20 to 50% by mass based on 100% by mass of the total amount of the conductive adhesive layer.

11. The conductive adhesive layer according to claim 1, wherein the first conductive particles (A) have a median diameter of 200 to 1000% of a thickness of the conductive adhesive layer.

12. The conductive adhesive layer according to claim 1, wherein the first conductive particles (A) are metal particles having a 20% compressive strength of 11 to 22 MPa in a 170° C. environment.

13. The conductive adhesive layer according to claim 1, wherein the content of the conductive particles in the conductive adhesive layer is 110 to 300 parts by mass based on 100 parts by mass of the total amount of the binder component.

14. The conductive adhesive layer according to claim 1, wherein the mass ratio of the first conductive particles (A) to the second conductive particles (B) [first conductive particles (A)/second conductive particles (B)] is 0.5 to 2.7.

15. The conductive adhesive layer according to claim 1, wherein the second conductive particles (B) have a median diameter of 8 to 20% of the median diameter of the first conductive particles (A).

16. The conductive adhesive layer according to claim 9, wherein a content of the first conductive particles (A) in the conductive adhesive layer is 20 to 50% by mass and a content of the second conductive particles (B) in the conductive adhesive layer is 20 to 50% by mass based on 100% by mass of the total amount of the conductive adhesive layer, and the first conductive particles (A) are metal particles having a 20% compressive strength of 11 to 22 MPa in a 170° C. environment.

17. The conductive adhesive layer according to claim 16, wherein the first conductive particles (A) have a median diameter of 200 to 1000% of a thickness of the conductive adhesive layer.

18. The conductive adhesive layer according to claim 17, wherein the content of the conductive particles in the conductive adhesive layer is 110 to 300 parts by mass based on 100 parts by mass of the total amount of the binder component.

* * * * *